(12) United States Patent
Suginobu et al.

(10) Patent No.: US 10,249,342 B2
(45) Date of Patent: Apr. 2, 2019

(54) BASE UNIT, DISK DRIVE APPARATUS, AND METHOD OF MANUFACTURING BASE UNIT

(71) Applicant: Nidec Corporation, Kyoto (JP)

(72) Inventors: Shingo Suginobu, Kyoto (JP); Takumi Shimomura, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 0 days.

(21) Appl. No.: 15/935,261

(22) Filed: Mar. 26, 2018

(65) Prior Publication Data
US 2018/0330761 A1 Nov. 15, 2018

(30) Foreign Application Priority Data
May 15, 2017 (JP) .................................. 2017-096550

(51) Int. Cl.
*G11B 33/02* (2006.01)
*G11B 33/12* (2006.01)
*G11B 25/04* (2006.01)

(52) U.S. Cl.
CPC ............ *G11B 33/02* (2013.01); *G11B 25/043* (2013.01); *G11B 33/122* (2013.01)

(58) Field of Classification Search
None
See application file for complete search history.

(56) References Cited

U.S. PATENT DOCUMENTS

| 6,970,322 | B2 * | 11/2005 | Bernett ................ G11B 25/043 360/245.9 |
| 7,872,836 | B2 | 1/2011 | Shindo et al. |
| 7,876,527 | B2 | 1/2011 | Nakamiya et al. |
| 8,059,364 | B1 * | 11/2011 | Andrikowich ..... G11B 33/1466 360/99.22 |
| 8,675,305 | B2 | 3/2014 | Watanabe et al. |
| 9,230,598 | B1 | 1/2016 | Bernett et al. |
| 9,747,953 | B1 | 8/2017 | Shimomura et al. |
| 9,886,984 | B2 * | 2/2018 | Akagi .................. G11B 33/027 |

(Continued)

*Primary Examiner* — William J Klimowicz
(74) *Attorney, Agent, or Firm* — Keating & Bennett, LLP

(57) ABSTRACT

A base unit includes a connector electrically connected to a motor having a central axis extending in a vertical direction, and a connector support portion arranged to support a board portion of the connector. The connector support portion includes a bottom plate portion arranged to extend perpendicularly to the central axis, and arranged to support a lower surface of the board portion; a window portion arranged to pass through the bottom plate portion in an axial direction, and arranged to cover or overlap with an electrode terminal of the connector when viewed in the axial direction; a first recessed portion defined in an upper surface of the bottom plate portion around the window portion, and arranged to overlap with the lower surface of the board portion when viewed in the axial direction; and a second recessed portion defined in the upper surface of the bottom plate portion, and arranged to be spaced apart from the first recessed portion. The first recessed portion has a thermosetting adhesive arranged therein to fix the bottom plate portion and the board portion to each other. The second recessed portion has a temporarily fixing adhesive arranged therein to temporarily fix the bottom plate portion and the board portion to each other.

12 Claims, 7 Drawing Sheets

(56) References Cited

U.S. PATENT DOCUMENTS

| 9,886,985 B1* | 2/2018 | Okamoto | G11B 33/027 |
| 2018/0308525 A1* | 10/2018 | Kaneko | G11B 33/027 |
| 2018/0308526 A1* | 10/2018 | Kaneko | G11B 33/027 |
| 2018/0322909 A1* | 11/2018 | Kaneko | G11B 33/027 |

* cited by examiner

BASE UNIT, DISK DRIVE APPARATUS, AND METHOD OF MANUFACTURING BASE UNIT

CROSS REFERENCE TO RELATED APPLICATIONS

This application claims the benefit of priority to Japanese Patent Application No. 2017-096550 filed on May 15, 2017. The entire contents of this application are hereby incorporated herein by reference.

BACKGROUND OF THE INVENTION

1. Field of the Invention

The present invention relates to a base unit, a disk drive apparatus, and a method of manufacturing the base unit.

2. Description of the Related Art

A hard disk drive typically has a motor arranged to rotate a disk installed therein. A known hard disk drive and a known motor are described in, for example, JP-A 2013-223312. A disk drive apparatus described in JP-A 2013-223312 includes a base member and a motor fixed to the base member. A connector, which is electrically connected to the motor, is fixed to an upper surface of the base member through an adhesive.

SUMMARY OF THE INVENTION

JP-A 2013-223312 indicates that a groove is defined around a position at which the connector is adhered to the base member, and that, when the connector is adhered to the base member, the adhesive in a pre-hardened state is retained in the groove to prevent the adhesive from protruding outwardly of the connector. In the case of the disk drive apparatus described in JP-A 2013-223312, however, it is necessary to transfer the base member into a furnace to harden the adhesive, and a displacement of the connector may occur during this transfer.

A base unit according to a preferred embodiment of the present invention includes a connector electrically connected to a motor having a central axis extending in a vertical direction, the connector including a board portion and an electrode terminal; a motor support portion arranged to support the motor; and a connector support portion arranged to support the board portion of the connector. The connector support portion includes a bottom plate portion arranged to extend perpendicularly to the central axis, and arranged to support a lower surface of the board portion; a window portion arranged to pass through the bottom plate portion in an axial direction, and arranged to cover or overlap with the electrode terminal of the connector when viewed in the axial direction; a first recessed portion defined in an upper surface of the bottom plate portion around the window portion, and arranged to overlap with the lower surface of the board portion when viewed in the axial direction; and a second recessed portion defined in the upper surface of the bottom plate portion, and arranged to be spaced apart from the first recessed portion. The first recessed portion has a thermosetting adhesive arranged therein to fix the bottom plate portion and the board portion to each other. The second recessed portion has a temporarily fixing adhesive arranged therein to temporarily fix the bottom plate portion and the board portion to each other.

According to a preferred embodiment of the present invention, the bottom plate portion and the board portion are temporarily fixed to each other, so that a displacement of the board portion of the connector can be prevented when the base unit is transferred into a furnace to harden the thermosetting adhesive. In addition, the second recessed portion contributes to preventing the temporarily fixing adhesive from getting up on an upper surface of the board portion of the connector. This in turn contributes to preventing the temporarily fixing adhesive from being attached to a retaining jig which may be placed on the upper surface of the board portion of the connector.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, preferred embodiments of the present invention will be described with reference to the accompanying drawings. It is assumed herein that a direction parallel to a central axis of a motor is referred to by the term "axial direction", "axial", or "axially", that directions perpendicular to the central axis of the motor are each referred to by the term "radial direction", "radial", or "radially", and that a direction along a circular arc centered on the central axis of the motor is referred to by the term "circumferential direction", "circumferential", or "circumferentially". It is also assumed herein that an axial direction is a vertical direction, and that a side on which a connector is arranged with respect to a bottom plate portion of a base member is an upper side, and the shape of each member or portion and relative positions of different members or portions will be described based on the above assumptions. Note, however, that the above definitions of the vertical direction and the upper and lower sides are simply made for the sake of convenience in description, and should not be construed to restrict the orientation of a base unit, a motor, or a disk drive apparatus according to any preferred embodiment of the present invention when in use.

Figure 1:
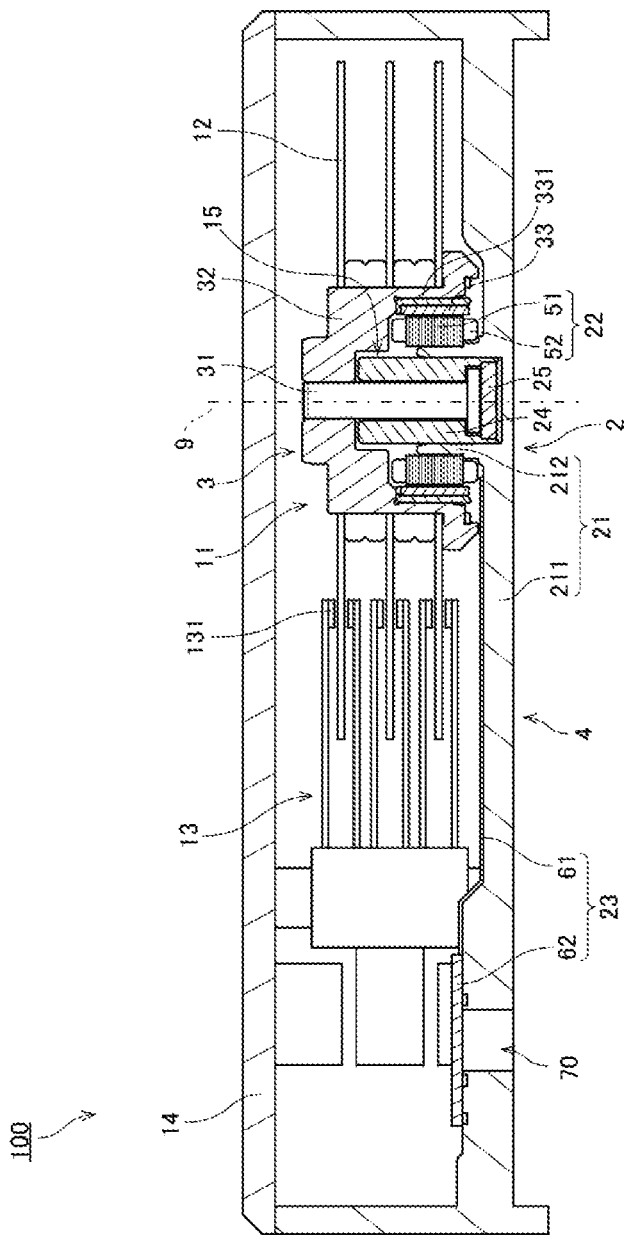
FIG. 1 is a sectional view of a disk drive apparatus according to a first preferred embodiment of the present invention.

FIG. 1 is a sectional view of a disk drive apparatus 100 according to a first preferred embodiment of the present invention.

The disk drive apparatus 100 is an apparatus arranged to perform reading and writing of information from or to magnetic disks 12 while rotating the magnetic disks 12. The disk drive apparatus 100 includes a motor 11, the magnetic disks 12, which are three in number, an access portion 13, and a cover 14.

The motor 11 is arranged to rotate the three magnetic disks 12 about a central axis 9 while supporting the magnetic disks 12. The disk drive apparatus 100 includes a base member 21 arranged to support the motor 11. A rotating portion 3 of the motor 11, the three magnetic disks 12, and the access portion 13 are housed in a casing defined by the base member 21 and the cover 14. The access portion 13 is arranged to move heads 131 along recording surfaces of the magnetic disks 12 to read and write information from or to the magnetic disks 12.

A junction of the base member 21 and the cover 14 is sealed by a sealant, such as, for example, an elastomer. In addition, an interior of the casing defined by the base member 21 and the cover 14 is filled with helium, hydrogen, a gas mixture of helium and hydrogen, or a gas mixture of any one of the above and air. Each of the above gases has a density lower than that of air outside of the casing. Accordingly, viscous drag which is applied to each of the magnetic disks 12 and the access portion 13 is low. This leads to a reduction in a windage loss of each of the magnetic disks 12 and the access portion 13 while the disk drive apparatus 100 is in operation.

Note that the number of magnetic disks 12 included in the disk drive apparatus 100 may alternatively be one, two, or more than three. Also note that the access portion 13 may alternatively be arranged to perform only one of the reading and the writing of information from or to the magnetic disk(s) 12.

Next, the structure of the above-described motor 11 will now be described below. The motor 11 includes a stationary portion 2 and the rotating portion 3. The stationary portion 2 is arranged to be stationary relative to both the base member 21 and the cover 14. The rotating portion 3 is supported to be rotatable with respect to the stationary portion 2.

The stationary portion 2 includes the base member 21, a stator portion 22, an electrical wiring portion 23, a sleeve 24, and a cap 25.

The base member 21 is arranged to support the stator portion 22 and the sleeve 24. The base member 21 is made of a metal, and is obtained by, for example, casting of an aluminum alloy. The base member 21 includes a bottom plate portion 211 and a cup portion 212 having a bottom and being substantially cylindrical. The bottom plate portion 211 is arranged to extend perpendicularly to the central axis 9 below the rotating portion 3, the magnetic disks 12, and the access portion 13. The cup portion 212 is arranged to be coaxial or substantially coaxial with the central axis 9. The cup portion 212 is a motor support portion arranged to support the motor 11.

The stator portion 22 includes a stator core 51 and a plurality of coils 52. The stator core 51 is, for example, defined by laminated steel sheets, that is, electromagnetic steel sheets, such as silicon steel sheets, placed one upon another in the axial direction. The stator core 51 is fixed to an outer circumferential surface of the cup portion 212. In addition, the stator core 51 includes a plurality of teeth arranged to project radially outward. Each coil 52 is defined by a conducting wire wound around a separate one of the teeth.

The electrical wiring portion 23 is arranged on an upper surface of the bottom plate portion 211, and is electrically connected to the coils 52. The electrical wiring portion 23 includes a flexible printed circuit board 61 and a connector 62. Electric drive currents supplied from an external power supply are supplied to the coils 52 through the connector 62 and the flexible printed circuit board 61. In the present preferred embodiment, the base member 21 and the electrical wiring portion 23 together define a base unit 4. The structure of the base unit 4 will be described in more detail below.

The sleeve 24 is arranged to extend in the axial direction to assume a substantially cylindrical shape around a shaft 31, which will be described below. A lower portion of the sleeve 24 is housed in the cup portion 212, and is fixed to the cup portion 212 through, for example, an adhesive. An inner circumferential surface of the sleeve 24 is arranged radially opposite to an outer circumferential surface of the shaft 31. In addition, a lower opening of the sleeve 24 is closed by the cap 25.

The rotating portion 3 according to the present preferred embodiment includes the shaft 31, a hub 32, and a magnet 33.

The shaft 31 is arranged to extend in the axial direction radially inside of the sleeve 24. A metal, such as stainless steel, for example, is used as a material of the shaft 31. An upper end portion of the shaft 31 is arranged to project upward above an upper surface of the sleeve 24. In addition, a lubricating fluid is arranged between the shaft 31 and a combination of the sleeve 24 and the cap 25. The shaft 31 is supported through the lubricating fluid to be rotatable with respect to the sleeve 24 and the cap 25.

That is, in the present preferred embodiment, a bearing mechanism 15 is defined by the combination of the sleeve 24 and the cap 25, both of which belong to the stationary portion 2, the shaft 31, which belongs to the rotating portion 3, and the lubricating fluid arranged therebetween. A polyolester oil or a diester oil, for example, is used as the lubricating fluid.

The hub 32 is arranged to extend radially outward and downward from a peripheral portion of the upper end portion of the shaft 31. An inner circumferential portion of the hub 32 is fixed to the upper end portion of the shaft 31. The three magnetic disks 12 are supported by the hub 32. In addition, the magnet 33 is fixed to the hub 32 with a back yoke 331 made of a magnetic material interposed therebetween. A radially inner surface of the magnet 33 is arranged radially opposite to each of the teeth of the stator core 51. In addition, the radially inner surface of the magnet 33 includes north and south poles arranged to alternate with each other in a circumferential direction.

Once the electric drive currents are supplied to the coils 52 in the motor 11 as described above, radial magnetic flux is generated around each of the teeth of the stator core 51. Then, interaction between the magnetic flux of the teeth and magnetic flux of the magnet 33 produces a circumferential torque, so that the rotating portion 3 is caused to rotate about the central axis 9 with respect to the stationary portion 2. The magnetic disks 12 supported by the hub 32 are caused to rotate about the central axis 9 together with the rotating portion 3.

Figure 2:
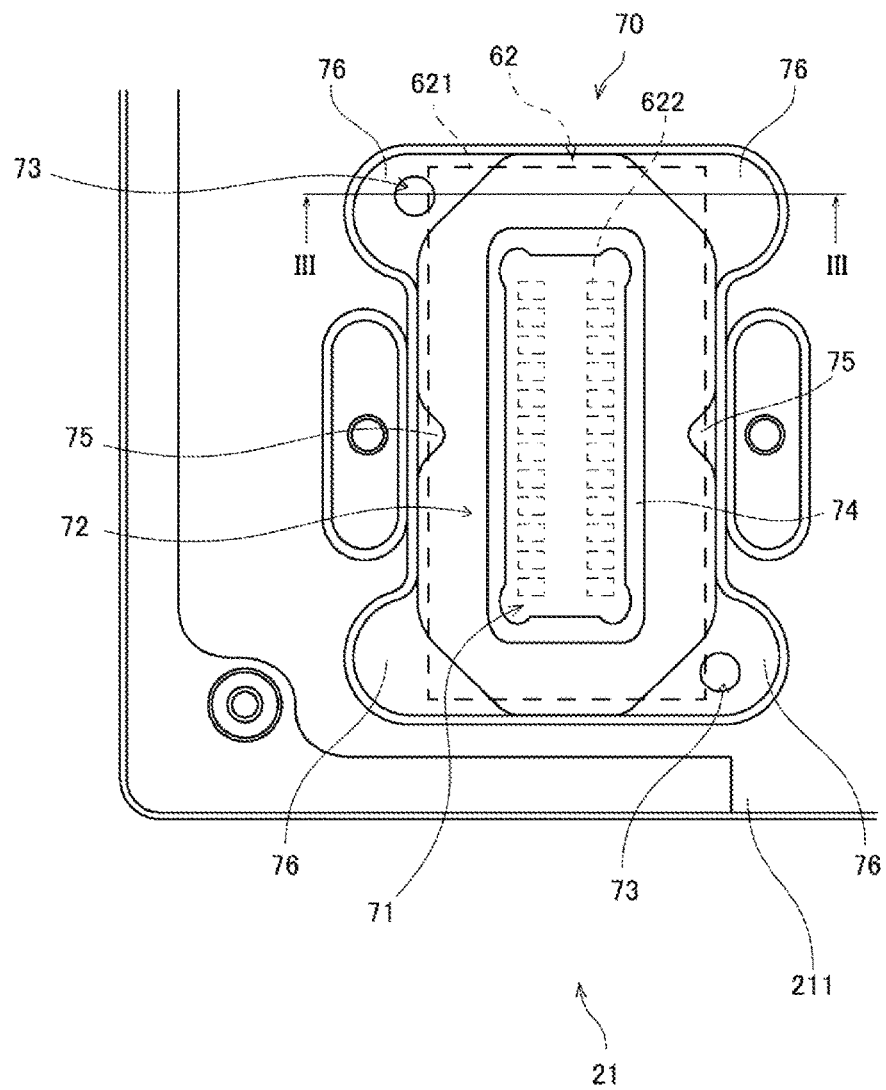
FIG. 2 is a partial top view of a base member according to the first preferred embodiment.
Figure 3:
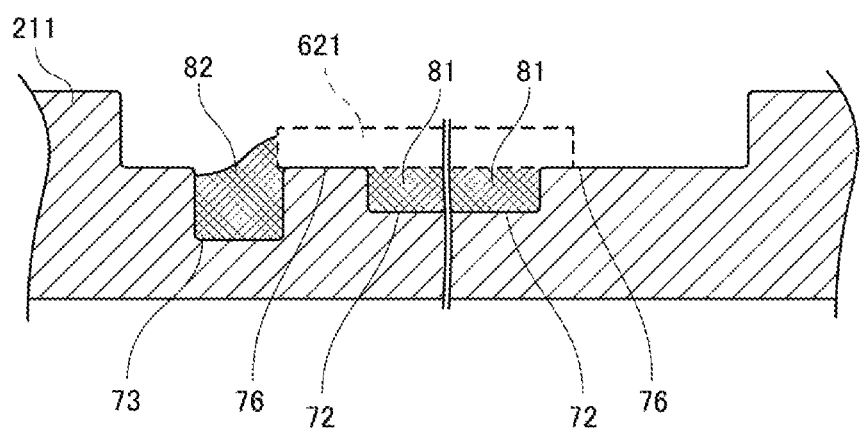
FIG. 3 is a sectional view of a portion of the base member taken along line III-III in FIG. 2.

Next, the base unit 4 will now be described below. As described above, the base unit 4 includes the base member 21 and the electrical wiring portion 23. FIG. 2 is a partial top view of the base member 21. FIG. 3 is a sectional view of a portion of the base member 21 taken along line III-III in FIG. 2.

The base member 21 includes a connector support portion 70. The connector support portion 70 is arranged to support the connector 62. The connector 62 includes a board portion 621 and a plurality of electrode terminals 622. The board portion 621 is a plate-shaped member including a rectangular upper surface and a rectangular lower surface. The electrode terminals 622 are arranged on the lower surface of the board portion 621. Each electrode terminal 622 is a portion to which an end portion of a lead wire extending from a power supply unit is connected. The connector support portion 70 is arranged to support the connector 62 by supporting the lower surface of the board portion 621. In FIG. 2, each of the board portion 621 and the electrode terminals 622 is represented by a dashed line.

The connector support portion 70 includes a window portion 71, a first recessed portion 72, two second recessed portions 73, a first base upper surface 74, two second base upper surfaces 75, and four third base upper surfaces 76.

The window portion 71 is a through hole arranged to pass through the bottom plate portion 211 in the axial direction. The window portion 71 is arranged to cover or overlap with the electrode terminals 622 when viewed in the axial direction. Each electrode terminal 622 is thus exposed to a space below a lower surface of the base member 21. This allows the power supply unit, which is arranged outside of the disk drive apparatus 100, to be electrically connected to each electrode terminal 622 through the lead wire.

The first recessed portion 72 is defined in the upper surface of the bottom plate portion 211. The first recessed portion 72 is loop-shaped, and is arranged to surround the window portion 71 with a gap therebetween. The first recessed portion 72 is arranged axially opposite to the lower surface of the board portion 621.

The first base upper surface 74 is a portion of the upper surface of the bottom plate portion 211, and is arranged between the window portion 71 and the first recessed portion 72. The first base upper surface 74 is arranged to extend in a loop to surround the window portion 71. That is, the first base upper surface 74 is arranged to extend from an edge portion of the window portion 71 outward away from the window portion 71 to reach an edge portion of the first recessed portion 72 on the side closer to the window portion 71. The first base upper surface 74 is arranged to support the lower surface of the board portion 621 around the electrode terminals 622.

Each of the two second base upper surfaces 75 is a portion of the upper surface of the bottom plate portion 211, and is arranged at an edge portion of the first recessed portion 72. The two second base upper surfaces 75 are arranged on opposite sides of the window portion 71. Each of the two second base upper surfaces 75 is arranged to project from the edge portion of the first recessed portion 72 toward the window portion 71. Each of the two second base upper surfaces 75 is arranged to support an edge portion of the lower surface of the board portion 621.

Each of the four third base upper surfaces 76 is a portion of the upper surface of the bottom plate portion 211, and is arranged at the edge portion of the first recessed portion 72. In more detail, the four third base upper surfaces 76 are arranged to surround the first recessed portion 72 at four corners. Each of the four third base upper surfaces 76 is arranged to overlap with a separate one of four corner portions of the board portion 621 of the connector 62 supported by the connector support portion 70 when viewed in the axial direction. Each of the four third base upper surfaces 76 is arranged to support a corner portion of the lower surface of the board portion 621.

Each of the two second recessed portions 73 is defined in one of the third base upper surfaces 76. In this preferred embodiment, each of the two second recessed portions 73 is defined in a separate one of two of the third base upper surfaces 76 which are arranged diagonally with respect to the board portion 621. In addition, each second recessed portion 73 is arranged to be spaced apart from the first recessed portion 72. Moreover, each second recessed portion 73 is arranged to overlap with an edge portion of the board portion 621 when viewed in the axial direction. Furthermore, each second recessed portion 73 is circular when viewed in the axial direction. A bottom surface of each second recessed portion 73 is flat and perpendicular to the axial direction.

Each of the first base upper surface 74, the two second base upper surfaces 75, and the four third base upper surfaces 76 is arranged at the same axial level. Accordingly, the board portion 621 is mounted on the first, second, and third base upper surfaces 74, 75, and 76 with stability.

Referring to FIG. 3, a thermosetting adhesive 81 is arranged in the first recessed portion 72. An epoxy resin adhesive, for example, is used as the thermosetting adhesive 81. The first recessed portion 72 lies between the lower surface of the board portion 621 and the bottom plate portion 211. Arranging the thermosetting adhesive 81 in the first recessed portion 72 results in the thermosetting adhesive 81 being interposed between the lower surface of the board portion 621 and the bottom plate portion 211.

The thermosetting adhesive 81 in a pre-hardened state is put into the first recessed portion 72. The thermosetting adhesive is hardened by being heated in a furnace or the like, for example. Hardening of the thermosetting adhesive 81 causes the board portion 621 and the bottom plate portion 211 to be fixed to each other.

An ultraviolet-curable adhesive 82 is arranged in each second recessed portion 73. The ultraviolet-curable adhesive 82 is a temporarily fixing adhesive used to temporarily fix the board portion 621 and the bottom plate portion 211 to each other. Referring to FIG. 3, the ultraviolet-curable adhesive 82 in a pre-hardened state is put into the second recessed portion 73 in such an amount that at least a portion of the ultraviolet-curable adhesive 82 is applied up to a side surface of the board portion 621. The ultraviolet-curable adhesive 82 is hardened by being irradiated with ultraviolet rays. Hardening of the ultraviolet-curable adhesive 82 causes the bottom plate portion 211 and the board portion 621 to be fixed to each other.

The thermosetting adhesive 81 is able to fix the board portion 621 and the bottom plate portion 211 to each other with greater strength than the ultraviolet-curable adhesive 82. However, when the thermosetting adhesive 81 is hardened to fix the board portion 621 and the bottom plate portion 211 to each other, it is necessary to transfer the base unit 4 into the furnace, and apply heat to the thermosetting adhesive 81. If the board portion 621 were not temporarily fixed to the bottom plate portion 211, this transfer might cause a displacement of the board portion 621. As mentioned above, the electrode terminals 622 of the connector 62 are exposed through the window portion 71 to allow the electrode terminals 622 to be electrically connected to the external power supply unit. A displacement of the board portion 621 might cause any of the electrode terminals 622 to fail to be exposed through the window portion 71.

Accordingly, in the present preferred embodiment, the board portion 621 and the bottom plate portion 211 are temporarily fixed to each other through the ultraviolet-curable adhesive 82 to prevent a displacement of the board portion 621. Since the ultraviolet-curable adhesive 82 can be hardened by being irradiated with ultraviolet rays, it is possible to fix the board portion 621 and the bottom plate portion 211 to each other through the ultraviolet-curable adhesive 82 without the need to transfer the base unit 4.

Since each second recessed portion 73 is spaced apart from the first recessed portion 72, the ultraviolet-curable adhesive 82 does not mix with the thermosetting adhesive 81. In addition, since the second recessed portions 73 are arranged diagonally with respect to the board portion 621, the board portion 621 is fixed at two separate positions through the ultraviolet-curable adhesive 82. This increases the strength with which the board portion 621 and the bottom plate portion 211 are temporarily fixed to each other, which contributes to preventing a displacement of the board portion 621 with respect to the bottom plate portion 211. Moreover, referring to FIG. 3, each second recessed portion 73 is arranged to have an axial depth greater than that of the first recessed portion 72. The increased depth of the second recessed portion 73 reduces the likelihood that the ultraviolet-curable adhesive 82 in the pre-hardened state will get up on an upper surface of the board portion 621.

A method of manufacturing the base unit 4, which involves fixing the connector 62 to the bottom plate portion 211, will now be described below.

Figure 4:
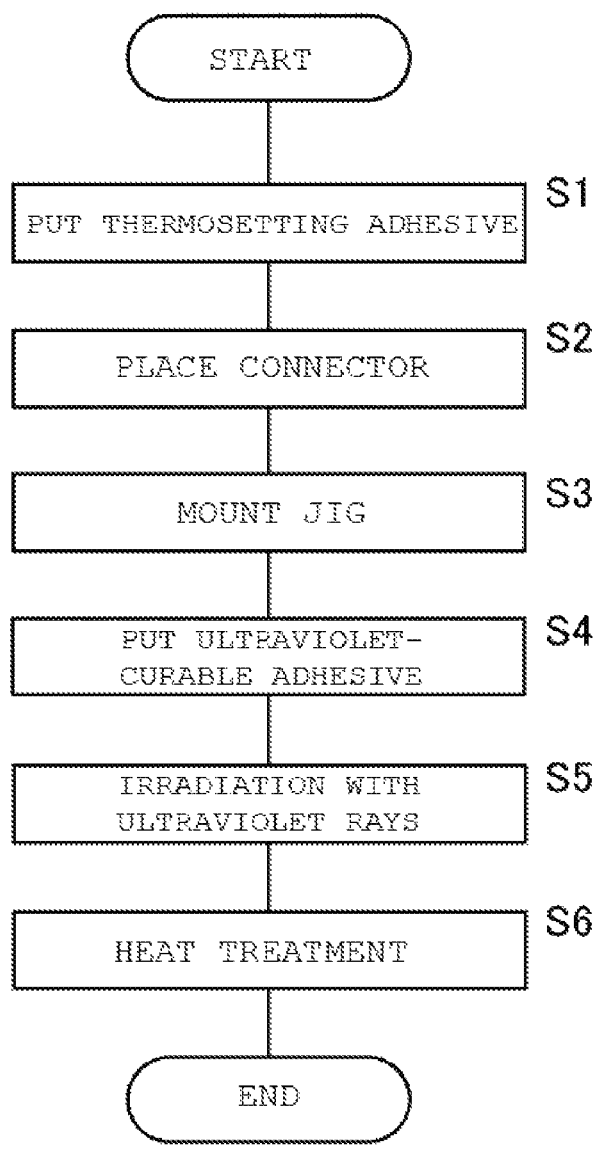
FIG. 4 is a flowchart illustrating a process of manufacturing a base unit according to the first preferred embodiment.

FIG. 4 is a flowchart illustrating a process of manufacturing the base unit 4.

When the board portion 621 of the connector 62 is fixed to the upper surface of the bottom plate portion 211, the thermosetting adhesive 81 in the pre-hardened state is first put into the first recessed portion 72 (step S1). Next, the board portion 621 is placed on the bottom plate portion 211 (step S2). At this time, the window portion 71 is arranged to cover or overlap with the electrode terminals 622 of the connector 62 when viewed in the axial direction. In this situation, a retaining jig (not shown) is mounted on the upper surface of the board portion 621 (step S3).

Next, the ultraviolet-curable adhesive 82 in the pre-hardened state is put into each second recessed portion 73 (step S4). The ultraviolet-curable adhesive 82 is put thereinto to such an extent that at least a portion of the ultraviolet-curable adhesive 82 is attached to the side surface of the board portion 621. Each second recessed portion 73 is arranged to have an axial depth greater than that of the first recessed portion 72. This reduces the likelihood that the ultraviolet-curable adhesive 82 in the pre-hardened state will get up on the upper surface of the board portion 621. This in turn contributes to preventing the ultraviolet-curable adhesive 82 from being attached to the retaining jig.

Then, the ultraviolet-curable adhesive 82 is irradiated with ultraviolet rays to harden the ultraviolet-curable adhesive (step S5). As a result, the board portion 621 and the bottom plate portion 211 are temporarily fixed to each other. In this state, the base unit 4 is transferred into the furnace, and heat is applied to the thermosetting adhesive 81 to harden the thermosetting adhesive 81 (step S6). As a result, the board portion 621 and the bottom plate portion 211 are fixed to each other.

While a preferred embodiment of the present invention has been described above, it is to be understood that the present invention is not limited to the above-described preferred embodiment.

Figure 5:
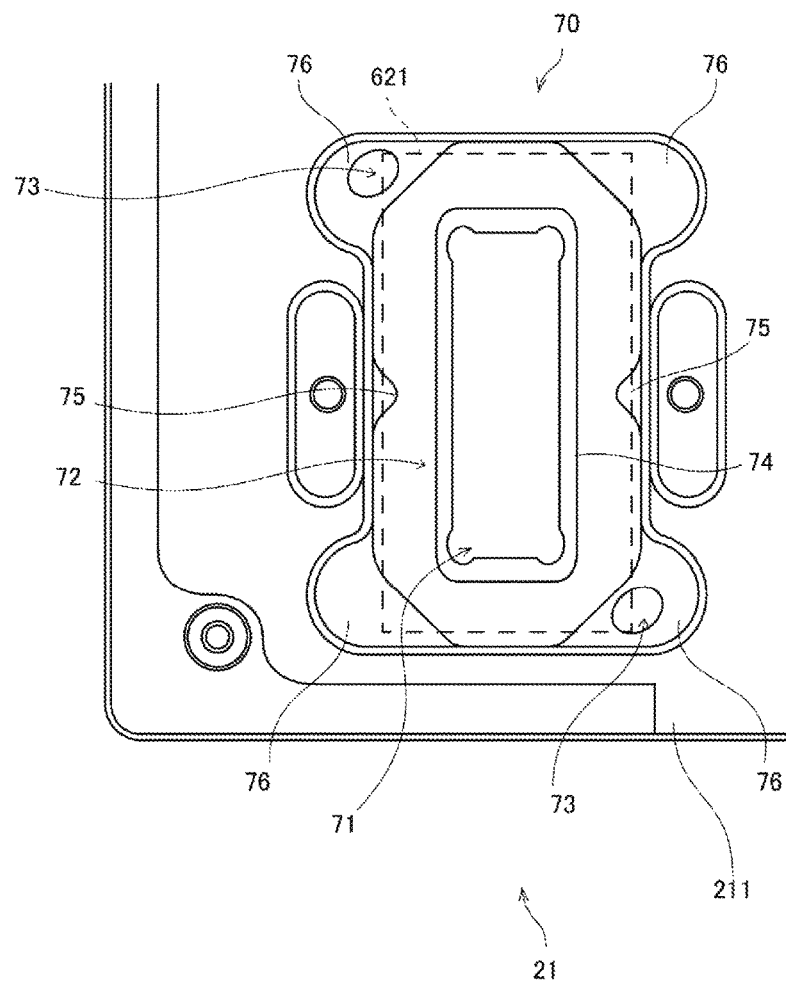
FIG. 5 is a diagram illustrating a connector support portion according to a modification of the first preferred embodiment.
Figure 6:
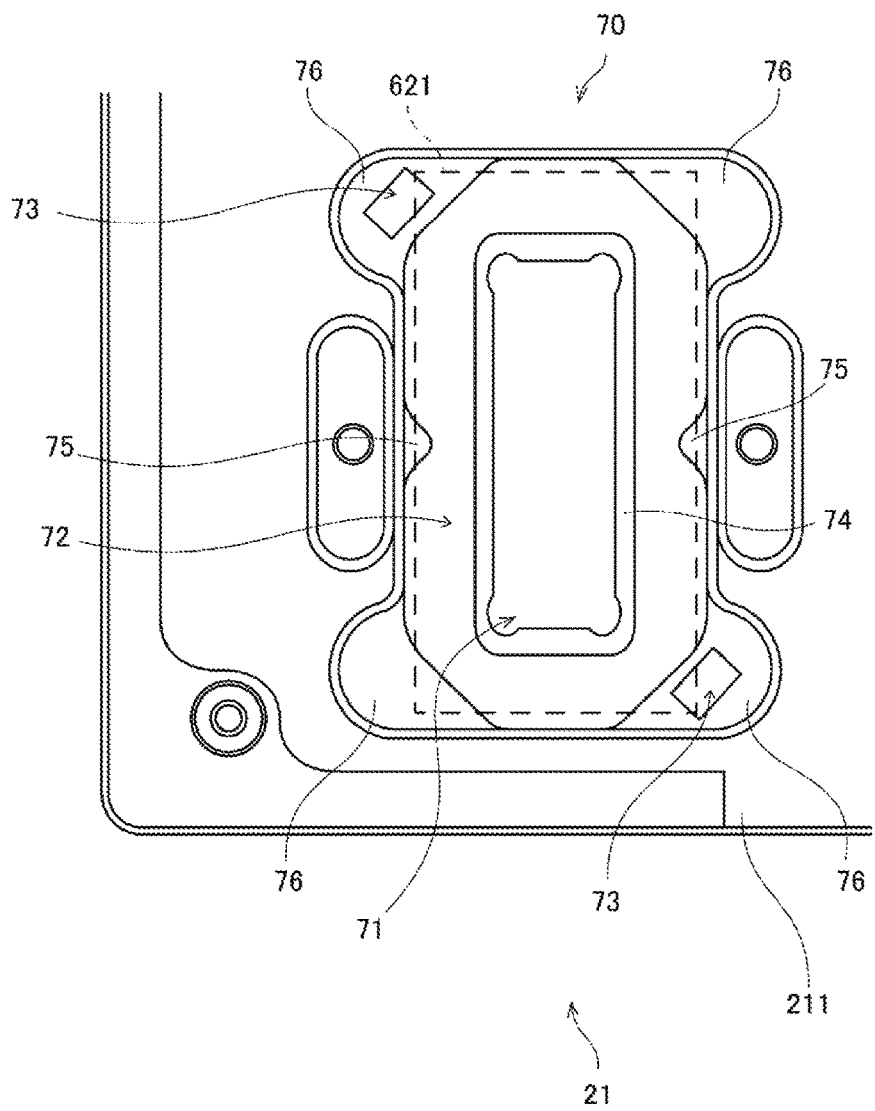
FIG. 6 is a diagram illustrating a connector support portion according to a modification of the first preferred embodiment.
Figure 7:
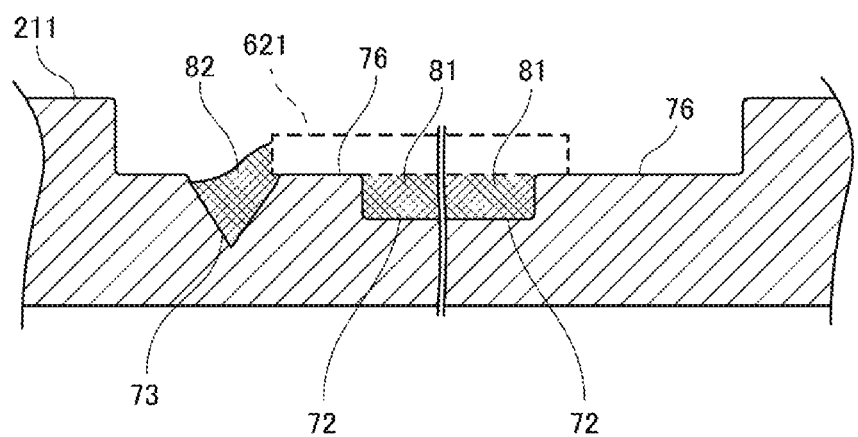
FIG. 7 is a diagram illustrating a connector support portion according to a modification of the first preferred embodiment.

Each of FIGS. 5, 6, and 7 is a diagram illustrating a connector support portion 70 according to a modification of the above-described preferred embodiment.

As illustrated in FIG. 5, each second recessed portion may alternatively be elliptical when viewed in the axial direction. Also, as illustrated in FIG. 6, each second recessed portion 73 may alternatively be rectangular when viewed in the axial direction. In the case where an opening of the second recessed portion 73 is in a shape having a longitudinal direction when viewed in the axial direction, it is preferable that the longitudinal direction of the second recessed portion 73 is arranged to extend along an outer edge of the first recessed portion. A space on the upper surface of the bottom plate portion 211 can thus be effectively used to enlarge an area where the board portion 621 and the bottom plate portion 211 are fixed to each other. That is, an improved reliability of the temporary fixing can thus be achieved.

Also, as illustrated in FIG. 7, the second recessed portion 73 may alternatively be in the shape of the letter "V", with an opening size decreasing in an axially downward direction, in a section parallel to the axial direction. Also, the second recessed portion 73 may alternatively be in the shape of a circular arc or a polygon other than a rectangle in a section parallel to the axial direction. Further, the number of second recessed portions 73 may alternatively be one or more than two.

Note that each second recessed portion 73 may or may not be arranged to overlap with one of the corner portions of the board portion 621 when viewed in the axial direction. It may be sufficient if the ultraviolet-curable adhesive 82 arranged in the second recessed portion 73 is in contact with the board portion 621 to temporarily fix the board portion 621 and the bottom plate portion 211 to each other.

Note that, in a plan view, the window portion 71 may be substantially rectangular as illustrated in FIG. 2, or may alternatively be in another shape. For example, the window portion may alternatively be circular or triangular in a plan view. Also note that, in a plan view, the first recessed portion 72 may alternatively be in a shape other than the shape thereof as illustrated in FIG. 2. Also note that the first recessed portion 72 may not necessarily be loop-shaped.

Preferred embodiments of the present invention are applicable to, for example, base units, disk drive apparatuses, and methods of manufacturing the base units.

Features of the above-described preferred embodiments and the modifications thereof may be combined appropriately as long as no conflict arises.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A base unit comprising:
    a connector electrically connected to a motor having a central axis extending in a vertical direction, the connector including a board portion and an electrode terminal;
    a motor support portion arranged to support the motor; and
    a connector support portion arranged to support the board portion of the connector; wherein
    the connector support portion includes:
        a bottom plate portion arranged to extend perpendicularly to the central axis, and arranged to support a lower surface of the board portion;

a window portion arranged to pass through the bottom plate portion in an axial direction, and arranged to cover or overlap with the electrode terminal of the connector when viewed in the axial direction;

a first recessed portion defined in an upper surface of the bottom plate portion around the window portion, and arranged to overlap with the lower surface of the board portion when viewed in the axial direction; and a second recessed portion defined in the upper surface of the bottom plate portion, and arranged to be spaced apart from the first recessed portion;

the first recessed portion has a thermosetting adhesive arranged therein to fix the bottom plate portion and the board portion to each other; and the second recessed portion has a temporarily fixing adhesive arranged therein to temporarily fix the bottom plate portion and the board portion to each other.

2. The base unit according to claim 1, wherein the second recessed portion is arranged to overlap with a corner portion of the board portion when viewed in the axial direction.

3. The base unit according to claim 1, wherein the connector support portion includes a plurality of the second recessed portions.

4. The base unit according to claim 1, wherein the second recessed portion is circular, elliptical, or rectangular when viewed in the axial direction.

5. The base unit according to claim 4, wherein, when viewed in the axial direction, the second recessed portion is elliptical or in a shape of a rectangle having long sides and short sides, with a longitudinal direction of the second recessed portion extending along an outer edge of the first recessed portion.

6. The base unit according to claim 1, wherein the second recessed portion includes a bottom surface being flat and perpendicular to the axial direction.

7. The base unit according to claim 1, wherein the second recessed portion is arranged to have an opening size decreasing in an axially downward direction.

8. The base unit according to claim 1, wherein the second recessed portion is arranged to overlap with an edge portion of the board portion when viewed in the axial direction.

9. The base unit according to claim 1, wherein the second recessed portion is arranged to have an axial depth greater than that of the first recessed portion.

10. The base unit according to claim 1, wherein the temporarily fixing adhesive is an ultraviolet-curable adhesive.

11. A disk drive apparatus comprising:

the base unit of claim 1;

an access portion arranged to perform at least one of reading and writing of information from or to a disk supported by a rotating portion of the motor; and a cover arranged to define a casing together with the base unit; wherein the motor and the access portion are housed in the casing.

12. A method of manufacturing a base unit including a motor support portion arranged to support a motor, and a connector support portion arranged to support a board portion of a connector electrically connected to the motor, the connector support portion including:

a bottom plate portion arranged to extend perpendicularly to a central axis of the motor, and arranged to support a lower surface of the board portion;

a window portion arranged to pass through the bottom plate portion in an axial direction, and arranged to cover or overlap with an electrode terminal of the connector when viewed in the axial direction;

a first recessed portion defined in an upper surface of the bottom plate portion around the window portion, and arranged to overlap with the lower surface of the board portion when viewed in the axial direction; and a second recessed portion defined in the upper surface of the bottom plate portion, and arranged to be spaced apart from the first recessed portion; the method comprising the steps of:

a) putting a thermosetting adhesive into the first recessed portion;

b) mounting the board portion of the connector on the bottom plate portion;

c) putting a temporarily fixing adhesive into the second recessed portion to temporarily fix the bottom plate portion and the board portion to each other; and d) hardening the thermosetting adhesive.

* * * * *